(12) United States Patent
Du

(10) Patent No.: US 10,616,462 B2
(45) Date of Patent: Apr. 7, 2020

(54) IMAGE CAPTURE CONTROL METHODS AND APPARATUSES

(71) Applicant: Beijing Zhigu Rui Tuo Tech Co., Ltd., Beijing (CN)

(72) Inventor: Lin Du, Beijing (CN)

(73) Assignee: BEIJING ZHIGU RUI TUO TECH CO., LTD, Beijing (CN)

(*) Notice: Subject to any disclaimer, the term of this patent is extended or adjusted under 35 U.S.C. 154(b) by 163 days.

(21) Appl. No.: 15/567,598

(22) PCT Filed: Apr. 22, 2016

(86) PCT No.: PCT/CN2016/079963
§ 371 (c)(1),
(2) Date: Oct. 18, 2017

(87) PCT Pub. No.: WO2016/169507
PCT Pub. Date: Oct. 27, 2016

(65) Prior Publication Data
US 2018/0115692 A1 Apr. 26, 2018

(30) Foreign Application Priority Data
Apr. 22, 2015 (CN) .................. 2015 1 01949070

(51) Int. Cl.
*H04N 5/225* (2006.01)
*H04N 5/232* (2006.01)
*H04N 5/247* (2006.01)

(52) U.S. Cl.
CPC ......... *H04N 5/2259* (2013.01); *H04N 5/2254* (2013.01); *H04N 5/232* (2013.01);
(Continued)

(58) Field of Classification Search
CPC .. H04N 5/2259; H04N 5/247; H04N 5/23245; H04N 5/23212; H04N 5/2254; H04N 5/232
See application file for complete search history.

(56) References Cited

U.S. PATENT DOCUMENTS 9,426,361 B2 * 8/2016 Venkataraman ....... H04N 5/265
2011/0157387 A1 * 6/2011 Han ..................... H04N 5/2253
348/218.1
(Continued)

FOREIGN PATENT DOCUMENTS

CN 102692791 A 9/2012
CN 102739945 A 10/2012
(Continued)

OTHER PUBLICATIONS

International Search Report for PCT Application No. PCT/CN2016/079963, dated Jul. 29, 2016, 4 pages.
(Continued)

*Primary Examiner* — Nhan T Tran
(74) *Attorney, Agent, or Firm* — Amin, Turocy & Watson, LLP

(57) ABSTRACT

An image capture control method comprises: inclining a lens relative to a respective initial optical axis, to change a ratio of pixels distributed along first and second directions in an effective region of an image sensing unit that is in an imaging system and corresponds to the lens, wherein the effective region is a region in which light through the lens is imaged on the corresponding image sensing unit, the first and second directions are perpendicular to the initial optical axis and each other, the image sensing unit comprises pixels distributed in array, and the pixels are used for recording multidirectional view information of a same object of a scene; and capturing an image of the scene by using the imaging system. Proportions of parallax information
(Continued)

recorded by the image sensing unit in the first and second directions are changeable, and view information can be differential captured in different directions.

36 Claims, 13 Drawing Sheets

(52) U.S. Cl.
CPC ..... *H04N 5/23212* (2013.01); *H04N 5/23245* (2013.01); *H04N 5/247* (2013.01)

(56) References Cited

U.S. PATENT DOCUMENTS

| | | | | |
|---|---|---|---|---|
| 2011/0221952 | A1* | 9/2011 | Hamada | H04N 5/23209 348/345 |
| 2012/0019676 | A1 | 1/2012 | Foote | |
| 2012/0243101 | A1 | 9/2012 | Nagasaka et al. | |
| 2015/0042834 | A1 | 2/2015 | Miao et al. | |
| 2016/0154088 | A1* | 6/2016 | Holtman | G01S 5/16 |
| 2016/0309074 | A1* | 10/2016 | Ishigami | G02B 3/0056 |
| 2016/0366335 | A1* | 12/2016 | Miyata | H04N 5/23232 |
| 2017/0090177 | A1* | 3/2017 | Echigo | G01B 11/24 |

FOREIGN PATENT DOCUMENTS

| | | |
|---|---|---|
| CN | 104486537 A | 4/2015 |
| WO | 2016065991 A1 | 5/2016 |

OTHER PUBLICATIONS

"Adobe LightField Camera Protypes", published online at [http://lightfield-forum.com/light-field-camera-prototypes/adobe-lightfield-camera-protypes/], retrieved Sep. 26, 2017, 4 pages.

* cited by examiner

IMAGE CAPTURE CONTROL METHODS AND APPARATUSES

RELATED APPLICATION

The present application is a U.S. National Stage filing under 35 U.S.C. § 371 of international patent cooperation treaty (PCT) application No. PCT/CN2016/079963, filed Apr. 22, 2016, and entitled "IMAGE CAPTURE CONTROL METHODS AND APPARATUSES", which claims the benefit of priority to Chinese Patent Application No. 201510194907.0, filed on Apr. 22, 2015, which applications are hereby incorporated into the present application by reference herein in their respective entireties.

TECHNICAL FIELD

The present application relates to the technical field of terminals, and, for example, to various image capture control methods and apparatuses.

BACKGROUND

Light field cameras support capture information of a scene by a single exposure. The captured information is such as space information and view information. The captured information may be used for calculation to generate diversified image effects such as digital refocusing, multiview, 3D reconstruction and the like, and the light field cameras have a broad application prospect.

At present, a light field camera mainly uses a micro lens array formed by arranging a plurality of lenses in square or hexagon, a region in which light through each lens in the micro lens array is imaged on an image sensing unit corresponding to the lens is round, and the quantities of pixels distributed along all directions in the round region are the same.

SUMMARY

The following briefly describes the present application, so as to provide a basic understanding of some aspects of the present application. It should be understood that, the brief description is not an exhaustive description of the present application. The description is neither intended to determine key or important parts of the present application, nor intended to limit the scope of the present application. An objective thereof is merely to give some concepts in a simplified manner as a preface for more detailed description hereinafter.

Embodiments of the present application provide various image capture control methods and apparatuses.

According to a first aspect, an example embodiment of the present application provides an image capture control method, comprising:

inclining at least one lens relative to a respective initial optical axis, to change a ratio of pixels distributed along two directions in an effective region of at least one image sensing unit that is in an imaging system and corresponds to the at least one lens, wherein the effective region is a region in which light through the lens is imaged on the corresponding image sensing unit; the two directions comprise a first direction and a second direction that are perpendicular to the initial optical axis and orthogonal to each other; and the image sensing unit comprises a plurality of pixels distributed in array, and the plurality of pixels is used for recording multidirectional view information of a same object of a scene; and capturing an image of the scene by using the imaging system. According to a second aspect, an embodiment of the present application further provides an image capture control apparatus, comprising:

an inclination control module, configured to incline at least one lens relative to a respective initial optical axis, to change a ratio of pixels distributed along two directions in an effective region of at least one image sensing unit that is in an imaging system and corresponds to the at least one lens, wherein the effective region is a region in which light through the lens is imaged on the corresponding image sensing unit; the two directions comprise a first direction and a second direction that are perpendicular to the initial optical axis and orthogonal to each other; and the image sensing unit comprises a plurality of pixels distributed in array, and the plurality of pixels is used for recording multidirectional view information of a same object of a scene; and an image capture module, configured to capture an image of the scene by using the imaging system.

According to example embodiments of the present application, at least one lens is inclined relative to a respective initial optical axis, to change a ratio of pixels distributed along two directions in an effective region of at least one image sensing unit that is in an imaging system and corresponds to the at least one lens, that is, quantities of the pixels distributed along the two directions in the effective region of the image sensing unit corresponding to the lens after the lens is inclined are different, and the pixel ratio is not equal to 1; in this way, when an imaging system with the inclined lens captures an image of a scene, proportions of parallax information actually recorded by the image sensing unit in a first direction and a second direction can be changed, and differential capture of view information in different directions can be implemented.

The following describes in detail possible embodiments of the present application with reference to accompanying drawings, to make these and other advantages of the present application more obvious.

BRIEF DESCRIPTION OF THE DRAWINGS

The present application may be understood better with reference to the following description in combination with accompanying drawings, wherein same or similar marks are used in all the accompanying drawings to represent same or similar components. The accompanying drawings together with the following detailed description are comprised in the specification and constitute a part of the specification, and are used to further illustrate possible embodiments of the present application and explain the principle and advantages of the present application. In the accompanying drawings.

A person skilled in the art should understand that, elements in the accompanying drawings are merely shown for simplicity and clarity, and are not necessarily drawn to scale. For example, in the accompanying drawings, the size of an element may be enlarged relative to another element, so as to facilitate enhancement of an understanding of the embodiments of the present application.

DETAILED DESCRIPTION

The following will describe in details illustrative embodiments of the present application with reference to accompanying drawings. For the purpose of clear and brief description, the specification does not describe all features of practical implementation manners. However, it should be understood that, many decisions specific to the implementation manners must be made during development of any one of the practical embodiments, so as to achieve a specific objective of a developer, for example, conformance to restrictive conditions related with a system and service, wherein the restrictive conditions may vary with different implementation manners. In addition, it should also be understood that, although development work may be very complex and time-consuming, for a person skilled in the art that benefits from the content of the present disclosure, the development work is only a routine task.

Another point that should be noted here is, to avoid the present application from being not clearly understood due to unnecessary details, the accompanying drawings and specification merely describe apparatus structures and/or processing steps closely related to the solutions of the present application, but omit the representation and description of parts and processing that have little relation with the present application, and have been known by a person of ordinary skill in the art.

The following further describes in detail example embodiments of the present application with reference to the accompanying drawings (a same numeral represents a same element in several accompanying drawings) and embodiments. The following embodiments are used to describe the present application, but are not intended to limit the scope of the present application.

A person skilled in the art may understand that, terms such as "first" and "second" in the present application are merely used to distinguish different steps, devices or modules, which neither represent any specific technical meaning, nor represent a necessary logical sequence among them.

Figure 1:
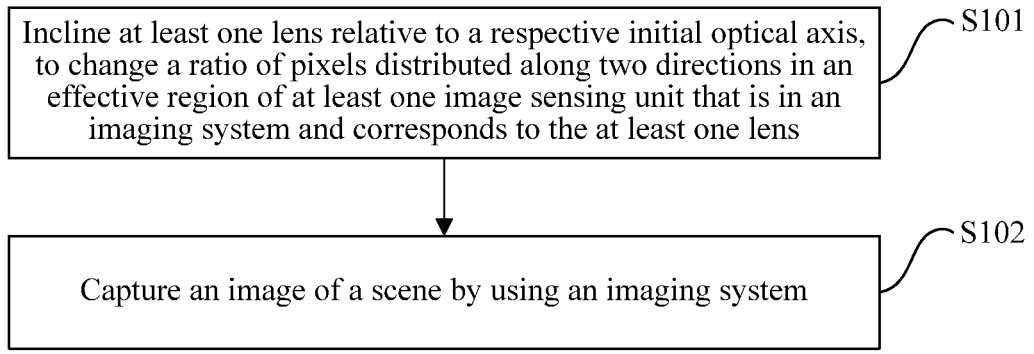
FIG. 1 is a flowchart of an image capture control method according to an example embodiment of the present application.

FIG. 1 is a flowchart of an image capture control method according to an embodiment of the present application. The image capture control method provided in this embodiment of the present application may be executed by an image capture control apparatus. There is no limitation to the manners in which the image capture control apparatus is embodied. For example, the image capture control apparatus may be an independent part; or the image capture control apparatus may be a functional module integrated in an imaging device, wherein the imaging device may comprise but is not limited to an electronic device such as a camera, a video camera, a mobile phone or a tablet computer having a camera shooting or photographing function, which is not limited in this embodiment of the present application. Specifically, as shown in FIG. 1, the image capture control method provided in this embodiment of the present application comprises:

S101: Incline at least one lens relative to a respective initial optical axis, to change a ratio of pixels distributed along two directions in an effective region of at least one image sensing unit that is in an imaging system and corresponds to the at least one lens, wherein the effective region is a region in which light through the lens is imaged on the corresponding image sensing unit; the two directions comprise a first direction and a second direction that are perpendicular to the initial optical axis and orthogonal to each other; and the image sensing unit comprises a plurality of pixels distributed in array, and the plurality of pixels is used for recording multidirectional view information of a same object of a scene.

S102: Capture an image of the scene by using the imaging system.

The initial optical axis of the lens according to this embodiment of the present application is an optical axis direction when the image sensing unit is in a non-inclined state. Generally, the lens and an image sensing unit are disposed corresponding to each other, the initial optical axis of the lens is parallel with a normal line of the image sensing unit, and the initial optical axis and the normal line are parallel with the horizontal plane.

The image sensing unit corresponding to the lens comprises a plurality of pixels distributed in array, a region in which light through the lens (the light may come from but is not limited to an object or a real image or virtual image of an object in the scene) is imaged on the image sensing unit is generally round, pixels of the image sensing unit in the round region record the information such as multidirectional view information corresponding to the light, and pixels of the image sensing unit outside the round region do not actually record light information; therefore, a region in which light through a lens is imaged on a corresponding image sensing unit (such as the round region) is referred to as an effective region of the image sensing unit, and other regions except the effective region of the image sensing unit are ineffective regions.

Generally, the effective region of the image sensing unit is a round region, quantities of pixels of the image sensing unit distributed in different directions in the effective region are equal, a ratio of the quantities of the pixels distributed along the different directions in the effective region (that is, a pixel ratio) is 1, for example, quantities of pixels distributed in two directions (the first direction and second direction) perpendicular to and orthogonal to the initial optical axis (the initial optical axis is parallel with the normal line of the image sensing unit) of the lens in the effective region are equal, and the pixel ratio is 1, the effective region provides pixel quantities of a same proportion for recording parallax information in the two directions, and proportions of the amount of information in the two directions in the view information captured into the effective region are equal.

However, in some situations, such as situations of multiview information image generation and 3D reconstruction, view information in different directions has different meanings and/or actions for practical application. For example, in a scene in which a multiview information image is generated by using image information captured by the imaging system, view information in a direction may be particularly focused, more different view images in this direction are desired to be generated, and focus on view information in a direction perpendicular to the above direction is less. For another example, in a scene in which 3D reconstruction is performed by using image information captured by the imaging system, as human eyes are more sensitive to horizontal direction views, it is expected to acquire more images of different parallaxes in horizontal direction to reconstruct a 3D scene, and human eyes are insensitive to perpendicular direction views. In a traditional manner for image capture, view information of a same proportion in different directions can be acquired, but in this capture manner, pixel resources of the image sensing unit are not fully used to meet requirements for differential proportions of view information in different directions.

For this purpose, this embodiment of the present application provides a corresponding solution. Specifically, at least one lens may be inclined relative to a respective initial optical axis, to change a ratio of pixels distributed along two directions in an effective region of at least one image sensing unit that is in an imaging system and corresponds to the at least one lens, that is, quantities of the pixels distributed along the two directions in the effective region of the image sensing unit corresponding to the lens after the lens is inclined are different, and the pixel ratio is not equal to 1; in this way, when an imaging system with the inclined lens captures an image of a scene, proportions of parallax information actually recorded by the image sensing unit in a first direction and a second direction can be changed, and differential capture of view information in different directions can be implemented.

The light through the lens forms a cone-similar enveloping space in a transmission process, and the apex of the cone may be an object or a real image or virtual image of an object in the scene; a region in which the light through the lens arrives at an image sensing unit and is imaged (effective region) may be considered as a section of the cone truncated by the image sensing unit.

Figure 2A:
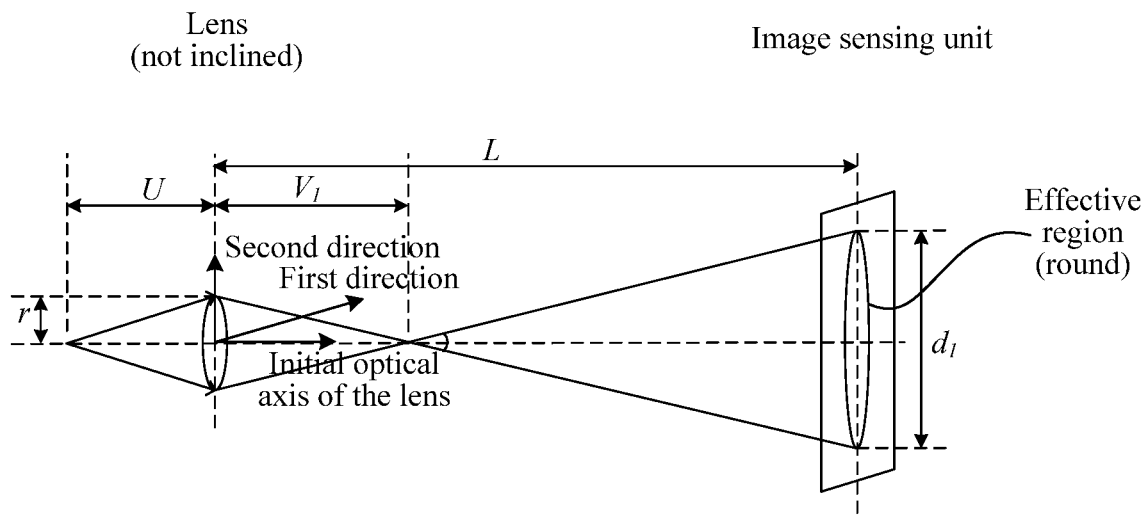
FIG. 2a is an example of a light path based on a lens that is not inclined according to an embodiment of the present application.

When the image sensing unit is in a non-inclined state, as shown in FIG. 2a, an optical axis of the lens is its initial optical axis, and is perpendicular to the plane of the image sensing unit, the region in which the light through the lens is imaged on the image sensing unit is round, that is, the effective region of the image sensing unit is round, and a ratio of pixels distributed along the first direction and the second direction in the effective region is equal to 1.

After the lens is inclined by an angle relative to its initial optical axis, the shape of the section of the light cone formed by the light through the inclined lens is changed due to the image sensing unit corresponding to the lens, that is, the shape of the region in which the light through the inclined lens arrives at the image sensing unit and is imaged (the effective region) is changed, the shape of the effective region becomes oval from round, and the quantities of the pixels along the first direction and the second direction in the shape-changed effective region are changed.

Besides the inclination of the lens relative to its initial optical axis, a combined action of one or more factors such as change of an interval between the lens and the image sensing unit corresponding to the lens, change of a focus length of the lens and rotation of the image sensing unit may cause change of the effective region. A distribution characteristic of the pixels in the shape-changed effective region is related to a manner and angle of inclination of the lens relative to its initial optical axis, the manner and angle of inclination of the lens may be flexibly controlled to cause the ratio of the pixels distributed in two directions of the shape-changed effective region to meet practical application requirements. For example, the at least one lens may be inclined by an angle relative to the second direction to change the shape of the effective region of the corresponding image sensing unit, thereby increasing or reducing a quantity of pixels distributed along a direction (such as the first direction or the second direction) in the corresponding effective region. Pixel distribution characteristics of the effective region that are possibly generated by inclination of the lens relative to its initial optical axis are described by using examples hereinafter.

In one possible situation, the quantity of the pixels distributed along the first direction is unchanged while the quantity of the pixels distributed along the second direction is reduced in the shape-changed effective region, and thereby the ratio of the pixels along the two directions in the effective region is changed. In this situation, the amount of view information captured in the second direction may be reduced, differential capture of view information in the two directions is implemented, the amount of view information captured in the second direction may be reduced, differential capture of view information in the two directions is implemented, and the output and processing data amount of the view information in the second direction is reduced. In scenes in which the view information in the second direction is less focused or required, a resource required for processing the view information in the second direction can be saved in this situation, and an actual use rate of a resource is improved.

Figure 2B:
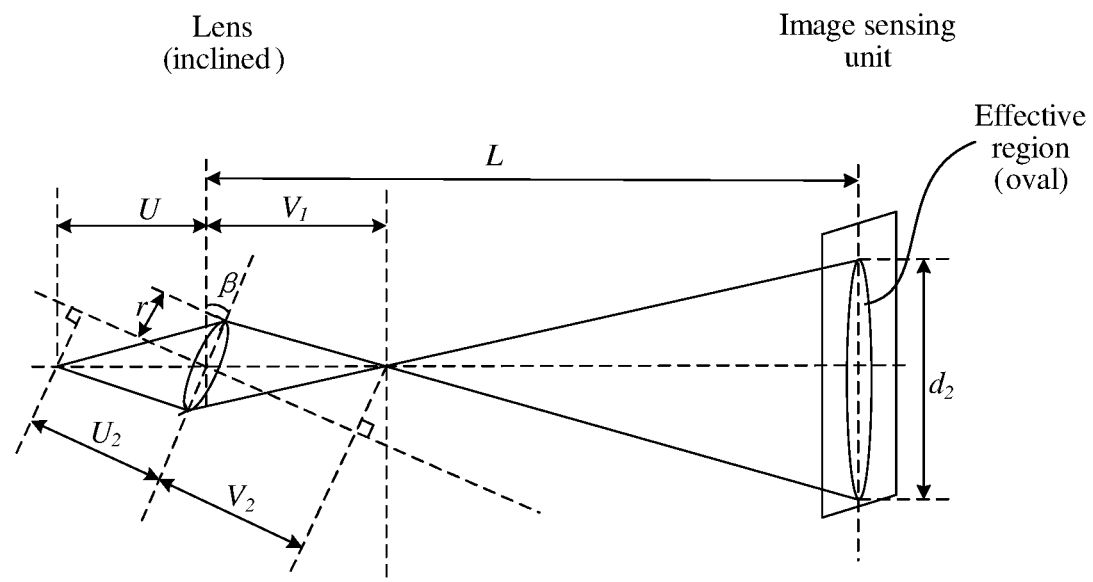
FIG. 2b is an example of a light path based on an inclined lens according to an embodiment of the present application.

For example, the shape of the effective region may be changed by inclining the lens, as shown in FIG. 2b, it is assumed that before and after the lens is inclined, the position of a object is unchanged, then it can be acquired according to an optical imaging formula that:

$$\begin{cases} \dfrac{1}{F} = \dfrac{1}{U} + \dfrac{1}{V_1} \\ \dfrac{1}{F} = \dfrac{1}{U'_2} + \dfrac{1}{V'_2} = \dfrac{1}{\cos\beta \cdot U} + \dfrac{1}{\cos\beta \cdot V_2} \end{cases} \quad (1)$$

In the formula, U is an object distance before the lens is inclined, $V_1$ is an image distance before the lens is inclined, F is a focus length of the lens, $\beta$ is an inclining angle of the lens, $U'_2$ is an object distance after the lens is inclined, and $V'_2$ is an image distance after the lens is inclined. It can be acquired according to the formula (1) that:

$$\dfrac{1}{V_1} - \dfrac{1}{V_2} = \dfrac{1}{F}(1 - \cos\beta) \quad (2)$$

Therefore, $V_2 \geq V_1$. Further, according to the cosine law, it can be acquired that the effective region in which the light through the lens before and after inclination is imaged on the image sensing unit corresponding to the lens meets:

$$\begin{cases} d_1 = 2r\left(\dfrac{1}{V_1} - 1\right) \\ d_2 = r\cos\beta(L - V_2)\left(\dfrac{1}{V_2 - r\sin\beta} + \dfrac{1}{V_2 + r\sin\beta}\right) \end{cases} \quad (3)$$

In the formula, $d_1$ is a length of an axis, along the second direction, of the effective region in which the light through the lens before inclination is imaged on the image sensing unit, $d_2$ is a length of an axis, along the second direction, of the effective region in which the light through the lens after inclination is imaged on the image sensing unit, r is a radius of the lens, L is a distance between the optical center of the lens and the image sensing unit (the distance is assumed to be unchanged before and after the lens is inclined). It can be acquired by combining the formulas (2) and (3) that:

$$\begin{cases} d_1 = 2r\left(\dfrac{L}{V_1} - 1\right) \\ d_2 = \dfrac{2r\left(\dfrac{L}{V_2} - 1\right)\cos\beta}{1 - \left(\dfrac{r\sin\beta}{V_2}\right)^2} \end{cases} \quad (4)$$

When $\beta=0$, $\cos\beta=1$, and it can be acquired that $d_1 = d_2$.

When $\beta \neq 0$ and $\beta$ is very small, $\sin\beta \approx 0$, and it can be acquired that $$d_2 = 2r\left(\dfrac{L}{V_2} - 1\right)$$

$\cos\beta$, and since $\cos\beta < 1$ and $V_2 \geq V_1$, it can be acquired that $d_2 < d_1$.

When $\beta \neq 0$, for example, parameters in an imaging system may be configured to:

$$\begin{cases} L = F \\ V_1 = 4r \\ L = 2V_1 \end{cases} \quad (5)$$

It can be acquired that:

$$\begin{cases} d_1 = 2r \\ d_2 = A \cdot 2r \end{cases} \quad (6)$$

In the formula, A may be:

$$A = \dfrac{64\cos^2\beta}{64 - \sin^2\beta(1 + \cos\beta)^2} \quad (7)$$

Figure 2C:
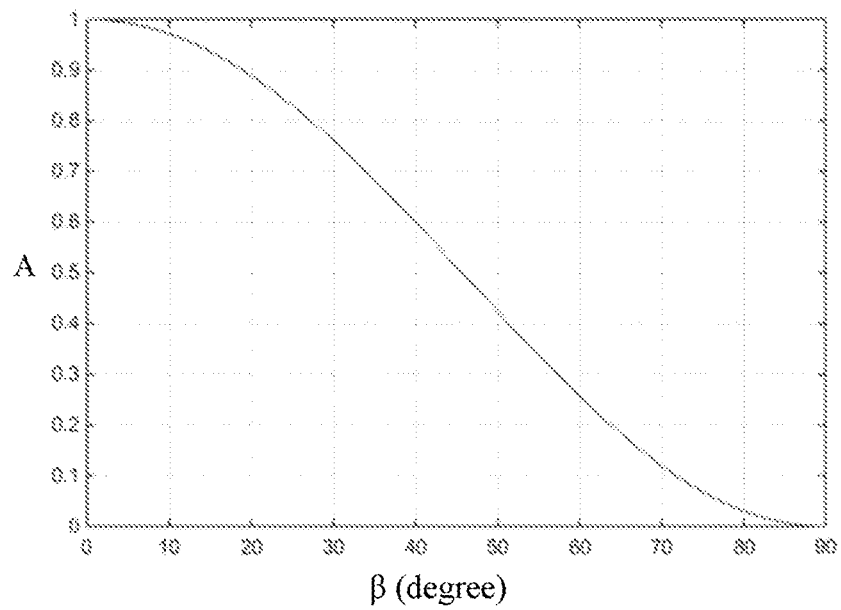
FIG. 2c is a possible numerical simulation curve of a change of a relationship between an inclining angle of a lens and an axial length parallel with a second direction in an effective region according to an example embodiment of the present application.

As shown in FIG. 2c, it can be acquired through numerical simulation that value A of the formula (7) is smaller than 1 in situations in which the lens is inclined by different angles, and therefore $d_2 < d_1$.

When $\beta \neq 0$, for another example, parameters in an imaging system may be configured to:

$$\begin{cases} L = 4F \\ L = 2V_1 \\ V_1 = 2r \end{cases} \quad (8)$$

It can be acquired that:

$$\begin{cases} d_1 = 2r \\ d_2 = A \cdot 2r \end{cases} \quad (9)$$

In the formula, A may be:

$$A = \dfrac{(4\cos\beta - 3)\cos\beta}{1 - \sin^2\beta(\cos\beta - 0.5)^2} \quad (10)$$

Figure 2D:
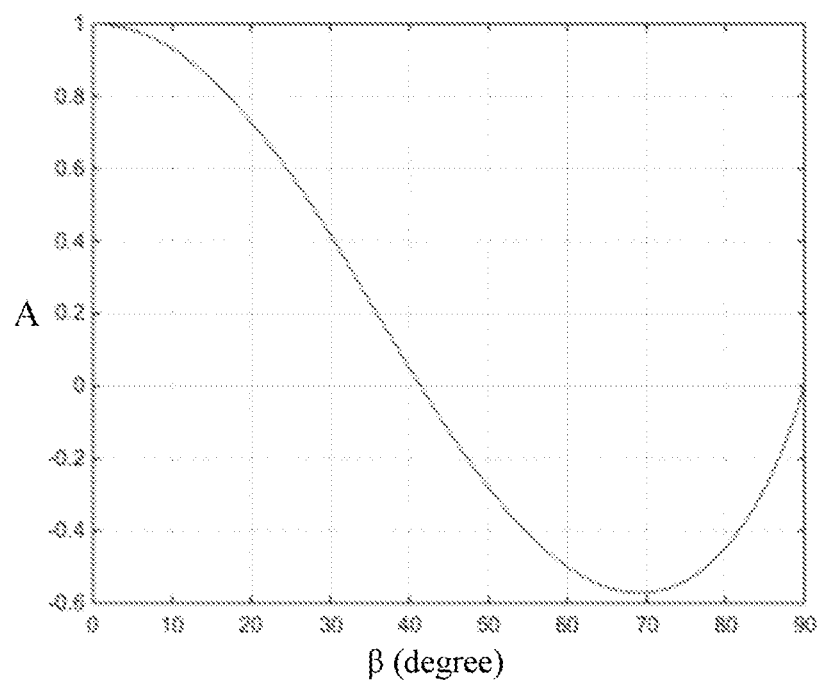
FIG. 2d is another possible numerical simulation curve of a change of a relationship between an inclining angle of a lens and an axial length parallel with a second direction in an effective region according to an example embodiment of the present application.

As shown in FIG. 2d, it can be acquired through numerical simulation that value A of the formula (10) is smaller than 1 in situations in which the lens is inclined by different angles, and therefore $d_2 < d_1$.

Through above theoretical derivation and analog simulation, in the imaging system, by inclining the lens relative to its initial optical axis, the shape of the light through the lens in effective region of the image sensing unit corresponding to the lens can be changed, such as the imaging system with foregoing configuration, by inclining the lens relative to its initial optical axis, the length of the axis of the effective region along the second direction is reduced, the length of the axis of the effective region along the first direction is unchanged, which is equivalent to that the shape of the effective region is changed to be oval corresponding to the lens from after inclining from round corresponding to the lens before inclining, that is, the shape-changed effective region is of an oval with the short axis parallel with the second direction, since the ratio of the pixels distributed along the first direction and the second direction of the oval effective region is different, differential capture of view information in the first direction and the second direction can be implemented based on the imaging system with the inclined lens, in addition, since the length $d_2d$ of the shape-changed effective region along the second direction is smaller than the diameter $d_1d$ of the shape-unchanged effective region, in this situation, the amount of view information captured in the second direction is reduced, and the output and processing data amount of the view information in the second direction is reduced. In scenes in which the view information in the second direction is less focused or required, a resource required for processing the view information in the second direction can be saved in this situation, and an actual use rate of a resource is improved.

In another possible situation, the quantity of the pixels distributed along the first direction is increased while the quantity of the pixels distributed along the second direction is unchanged in the shape-changed effective region, and thereby the ratio of the pixels along the two directions in the effective region is changed. In this situation, the amount of view information captured in the first direction can be increased, and differential capture of view information in the two directions is implemented. In addition, the image sensing unit comprises a plurality of pixels distributed in array, generally, the effective region comprises partial pixels of the image sensing unit, that is, pixels in the ineffective regions distributed outside the effective region of the image sensing unit do not actually record light information, and thereby, the pixels of the image sensing unit are not fully used. In this situation, the shape-changed effective region can increase the pixels distributed in the first direction, the proportion of ineffective pixels of the image sensing unit is reduced, and thereby the actual use rate of pixels of the image sensing unit is improved.

In another possible situation, the quantity of the pixels distributed along the first direction is increased while the quantity of the pixels distributed along the second direction is reduced in the shape-changed effective region, and thereby the ratio of the pixels along the two directions in the effective region is changed. In this situation, advantages of the two situations above can be combined and an actual use rate of a resource is improved.

A possible situation may also comprise: the quantities of the pixels along the two directions in the shape-changed effective region are both increased but increased by different quantities to change the ratio of the pixels distributed in the two directions, or a possible situation may comprise: the quantities of the pixels along the two directions in the shape-changed effective region are both reduced but reduced by different quantities to change the ratio of the pixels distributed in the two directions, and thereby differential capture of view information in the two directions is implemented by changing the pixel ratio.

In the technical solution provided in this embodiment of the present application, besides that the shape of the light through the inclined lens is changed in the effective region of the image sensing unit, the position of the effective region in the image sensing unit is also accordingly offset, for example, after the lens is clockwise inclined by an angle relative to a respective initial optical axis, the light through the inclined lens moves down at the imaging position of the plane of the image sensing unit along the second direction; or after the lens is counterclockwise inclined by an angle relative to a respective initial optical axis, the light through the inclined lens moves down at the imaging position of the plane of the image sensing unit along the second direction If the offset is smaller, or the impact of offset on the image capture is smaller, adjustment is not required; if adjustment is required, the image capture control method comprises: before the capturing an image of the scene by using the imaging system, translating the at least one lens and/or the image sensing unit corresponding to the at least one lens along the second direction, to cause the light through the inclined lens to be at the imaging position of the plane of the image sensing unit corresponding to the lens, and to be in the image sensing unit. That is, the lens can be moved up or down along the second direction, or the image sensing unit can be moved up or down, or the lens and the image sensing unit can be moved in a match manner in the second direction, to cause the light through the inclined lens to be at the imaging position of the plane of the image sensing unit corresponding to the lens, and to be in the image sensing unit. Further, the translation distance of the lens and/or the image sensing unit along the second direction is controlled to cause an image of the light through the inclined lens to be imaged at the plane of the image sensing unit corresponding to the lens to be symmetrically distributed in the image sensing unit, so as to better capture the view information of the light in different directions.

Figure 3:
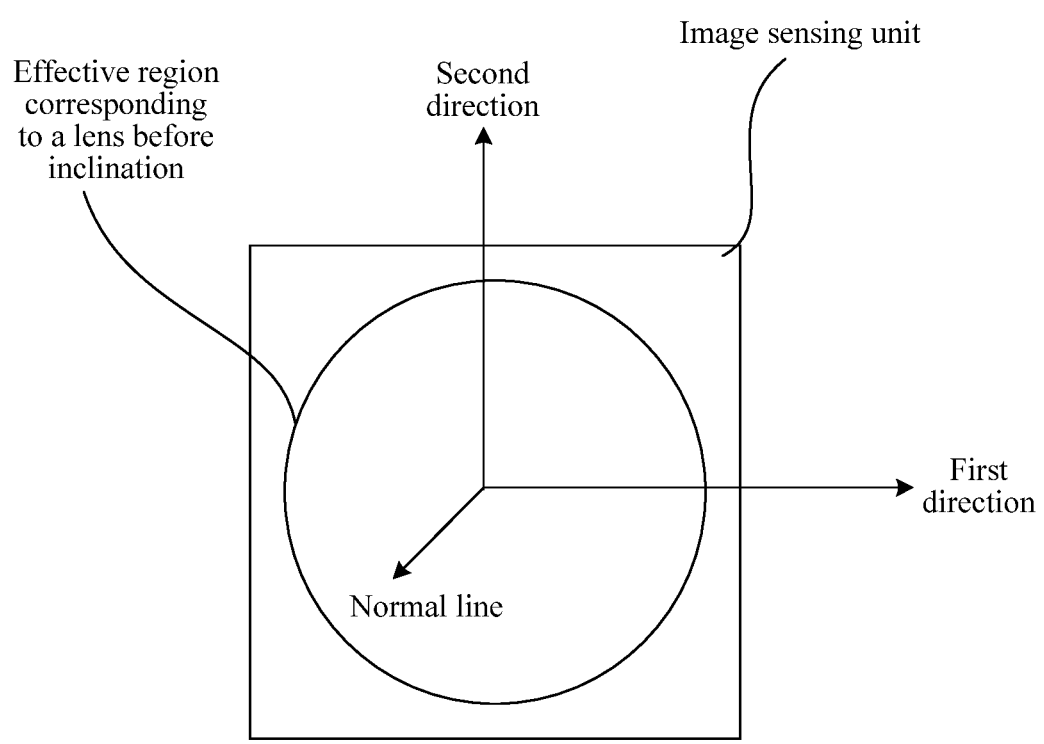
FIG. 3 is an example of an effective region of an image sensing unit corresponding to a lens that is not inclined according to an embodiment of the present application.
Figure 4:
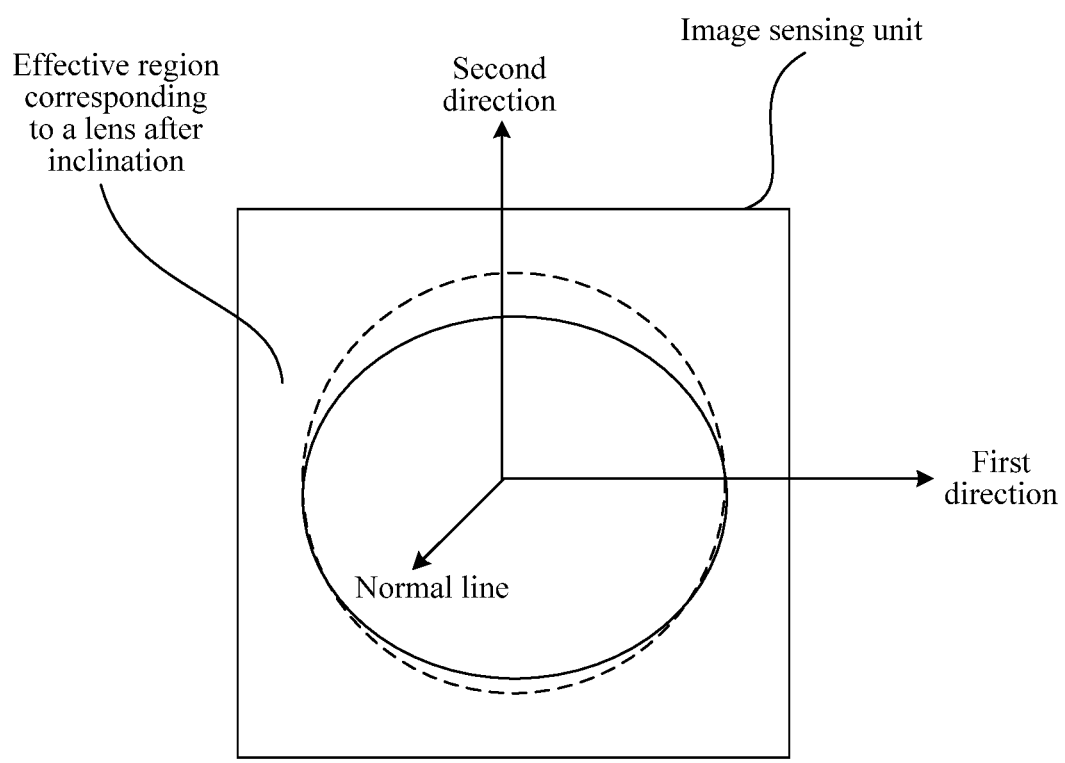
FIG. 4 is an example of an effective region of an image sensing unit corresponding to an inclined lens according to an embodiment of the present application.

In addition, in the technical solution provided in this embodiment of the present application, the first direction and the second direction are flexibly determined under the premise of being perpendicular to the initial optical axis of the lens and orthogonal to each other, which is not limited in the present application. Optionally, as shown in FIG. 3, the first direction is a horizontal direction perpendicular to the initial optical axis, and the second direction is perpendicular to the initial optical axis and the first direction. Research shows that human eyes (left eye and right eye) are in horizontal distribution, which causes that human vision is more sensitive to horizontal direction view information and insensitive to vertical direction view information to some extent; therefore, in an image capture process, the view information in the horizontal direction and the vertical direction has different impact on human eye vision in scenes such as a 3D reconstruction scene, and the view information in the horizontal direction is more focused or required than the view information in the vertical direction. By determining the horizontal direction and the vertical direction perpendicular to the initial optical axis as the first direction and the second direction, differential capture of view information in different directions by the image sensing unit can be implemented, a proportion of view information in the first direction (horizontal direction) is increased in image information captured by the image sensing unit, and/or a proportion of view information in the second direction (vertical direction) is reduced in the image information captured by the image sensing unit, the shape-changed effective region is of an oval with the short axis parallel with the second direction (a possible example is shown in FIG. 4), and thereby an actual use ratio of a resource is improved and a practical application requirement on diversity is better met.

Generally, the effective region is a part of the image sensing unit, that is, the effective region does not comprise all pixels of the image sensing unit, and if the effective region comprises the pixels of the image sensing unit as much as possible, more pixels are involved in image capture, and the actual use rate of the pixels is improved.

Optionally, before the capturing an image of the scene by using the imaging system, the method further comprises: translating the lens along the initial optical axis, to increase the effective region in which the light through the lens is imaged on the corresponding image sensing unit. The movement of the lens along the initial optical axis changes the size of the effective region in which the light through the lens is imaged on the image sensing unit, for example, the lens is moved along with the initial optical axis to the direction in which the distance between the image sensing unit and the corresponding lens is increased, that is, the lens is moved along the initial optical axis to the direction away from image sensing unit, and the effective region in which the light through the lens is imaged on the image sensing unit is enlarged. Since in the solution, the lens is translated along the initial optical axis to enlarge the effective region in which the light through the lens is imaged on the image sensing unit, to cause the maximal variable range of the ratio of the pixels distributed along the first direction and the second direction in the effective region to be accordingly increased, thereby the adjustment flexibility of the ratio of the pixels distributed in the two directions is increased, the universality of the solution is increased, and the practical application requirement on diversity is met. It should be understood that the operation of translating the lens along the initial optical axis may be performed before or after the operation of inclining and/or translating the lens along the first direction, and/or rotating the image sensing unit, and the implementation manner is thus flexible. In addition, the focusing state when the imaging system performs image capture may be changed by the translation of the lens along the initial optical axis, and in this situation, whether the focusing compensation is required is determined according to actual needs. For example, if the focusing compensation is required, manners comprising but not limited to the manner of adjusting the focus length of the lens may be used, to cause the adjusted focusing position to be close as far as possible to or overlapped with the focusing position before the adjustment, or cause the adjusted focusing position to fall into a refocusing range allowed before the imaging system is adjusted; in some situations, such as a situation in which the adjustment of the focusing position affects the image capture little or the adjusted focusing position still falls into the refocusing range allowed before the imaging system is adjusted and the like, the focusing compensation is not required.

Optionally, before the capturing an image of the scene by using the imaging system, the method further comprises: adjusting a focus length of the lens, to increase the effective region in which the light through the lens is imaged on the corresponding image sensing unit. The adjustment of the focus length of the lens changes the size of the effective region in which the light through the lens is imaged on the image sensing unit, for example, the focus length of the lens is adjusted, to cause that the effective region in which the light through the focus length-adjusted lens is imaged on the corresponding image sensing unit is increased as compared with the effective region in which the light through the focus length-unchanged lens is imaged on the image sensing unit. In the solution, a maximal variable range of the ratio of the pixels distributed along the first direction and the second direction in the effective region is accordingly increased, and thereby the adjustment flexibility of the ratio of the pixels distributed in the two directions is increased, the universality of the solution is increased, and the practical application requirement on diversity is met. It should be understood that the operation of adjusting the focus length of the lens may be performed before or after the operation of inclining and/or translating the lens along the first direction, and/or rotating the image sensing unit, and the implementation manner is thus flexible. In addition, the focusing state when the imaging system performs image capture may be changed by the adjustment of the focus length of the lens, and in this situation, whether the focusing compensation is required is determined according to actual needs. For example, if the focusing compensation is required, manners comprising but not limited to the manner of translating the lens along a respective initial optical axis may be used, to cause the adjusted focusing position to be close as far as possible to or overlapped with the focusing position before the adjustment, or cause the adjusted focusing position to fall into a refocusing range allowed before the imaging system is adjusted; in some situations, such as a situation in which the adjustment of the focusing position affects the image capture little or the adjusted focusing position still falls into the refocusing range allowed before the imaging system is adjusted and the like, the focusing compensation is not required.

Figure 5:
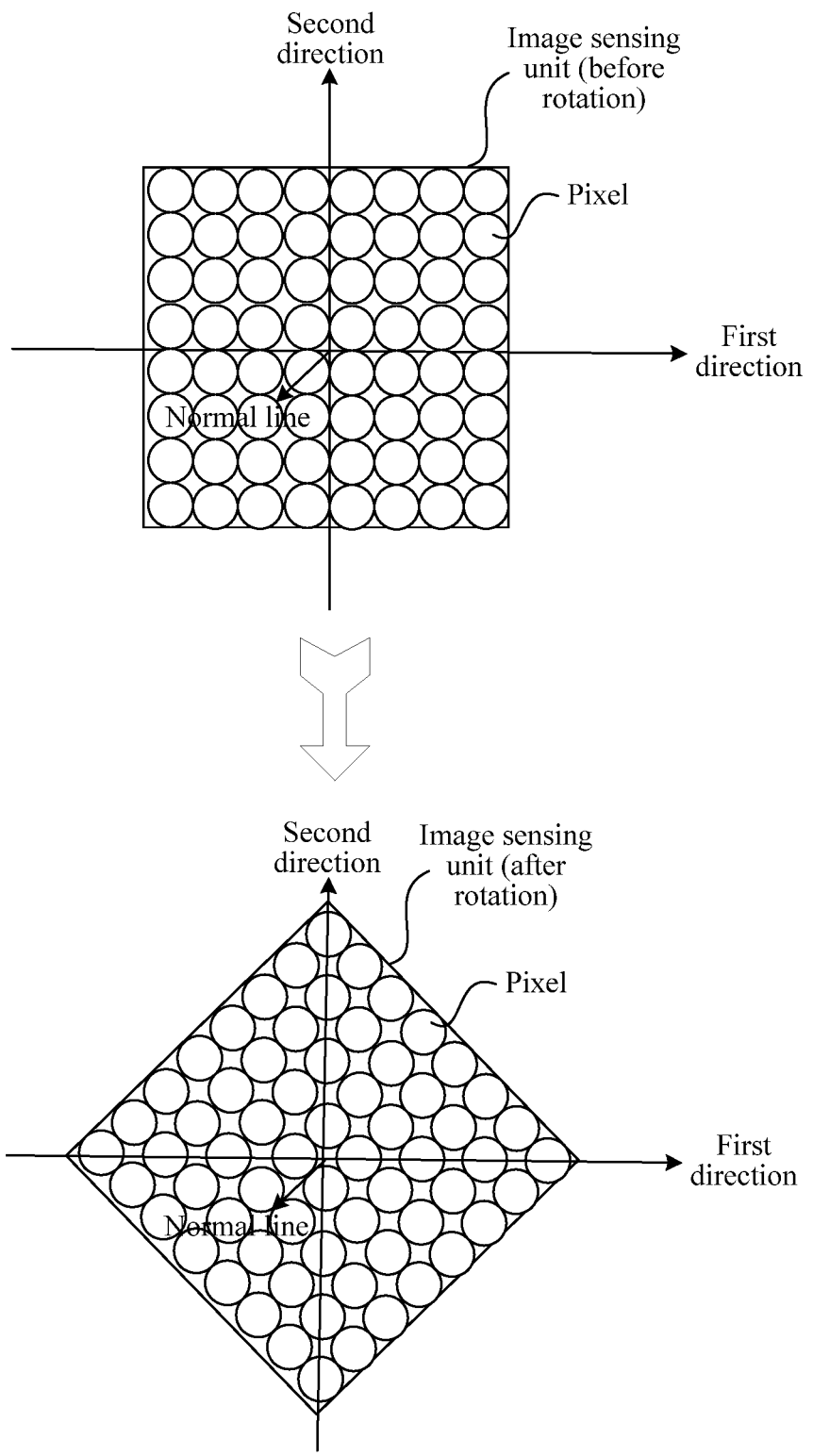
FIG. 5 is an example of rotation of an image sensing unit according to an embodiment of the present application.

In the technical solution provided in this embodiment of the present application, by inclining the lens relative to a respective initial optical axis, the shape and size of the effective region in which the light through the inclined lens is imaged on the image sensing unit corresponding to the lens can be changed, and an actually changed pixel quantity in the effective region is related to a pixel quantity and relative position of the image sensing unit. The effective region is enlarged, to increase the maximal variable range of the ratio of the pixels distributed along the first direction and the second direction, and a pixel quantity allowed to be increased along a direction in the effective region is related to the quantity of the pixels actually distributed in the corresponding direction of the image sensing unit. Optionally, before the capturing an image of the scene by using the imaging system, the method further comprises: rotating the image sensing unit around a respective normal line, to increase a maximal value of a pixel quantity allowed to be changed along the first direction in the effective region. For example, as shown in FIG. 5, the image sensing unit is rotated by 45 degrees around its normal line to cause that after the image sensing unit is rotated, the maximal value of the pixel quantity allowed to be changed along the first direction in the effective region is increased as compared with that before the image sensing unit is rotated, which is equivalent to that a maximal variable boundary of the effective region along the first direction is increased, helping to capture the view information in the first direction with more pixels of the existing pixels of the image sensing unit, increasing a proportion of the view information in the first direction in image information captured by the image sensing unit, implementing differential capture of view information in different directions, and improving the actual use rate of the resource as far as possible. It should be noted that the operation of rotating the image sensing unit may be performed before or after the lens is inclined (and/or the lens is translated along the second direction, and/or the lens is translated along the initial optical axis and/or the image sensing unit is translated along the second direction), and the implementation manner is flexible, which is not limited in this embodiment of the present application.

The imaging system to which the technical solution provided in this embodiment of the present application may be applied has a characteristic of recording view information of a same object in different directions in a scene by using a plurality of pixels.

Figure 6:
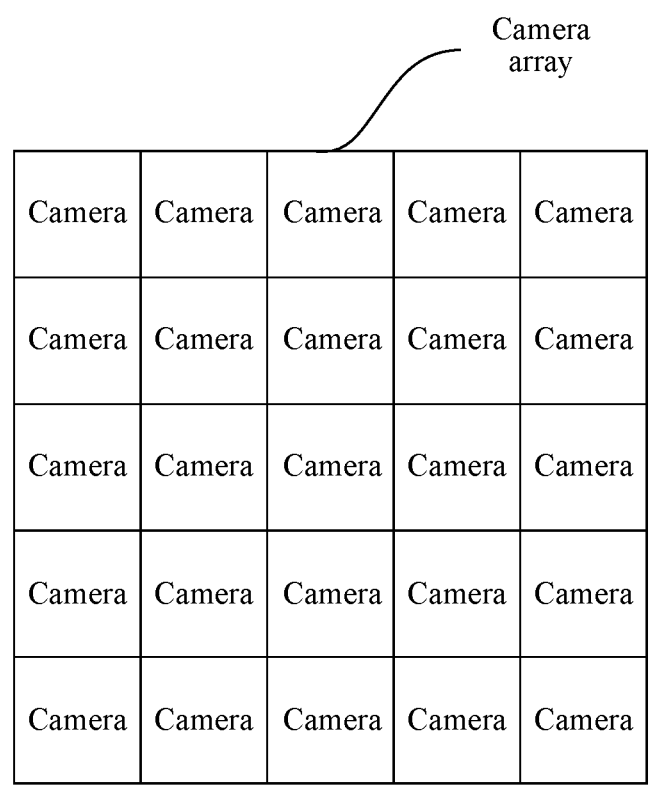
FIG. 6 is a schematic structural diagram of a camera array according to an example embodiment of the present application.

Optionally, the imaging system comprises a camera array, as shown in FIG. 6, the camera array comprises a plurality of cameras distributed in array, and the cameras comprise lenses and image sensing units disposed in sequence. An image sensing unit of each camera comprises a plurality of pixels distributed in array, used for recording view information of a same object in different directions in the scene. Objects in the scene and corresponding to image sensing units of different cameras may be different. In the camera array, image sensing units of one or more cameras may be inclined, to implement differential capture of view information of objects in different directions by the image sensing units corresponding to the lenses of the one or more cameras, and thereby a practical application requirement on diversity is met.

Figure 7:
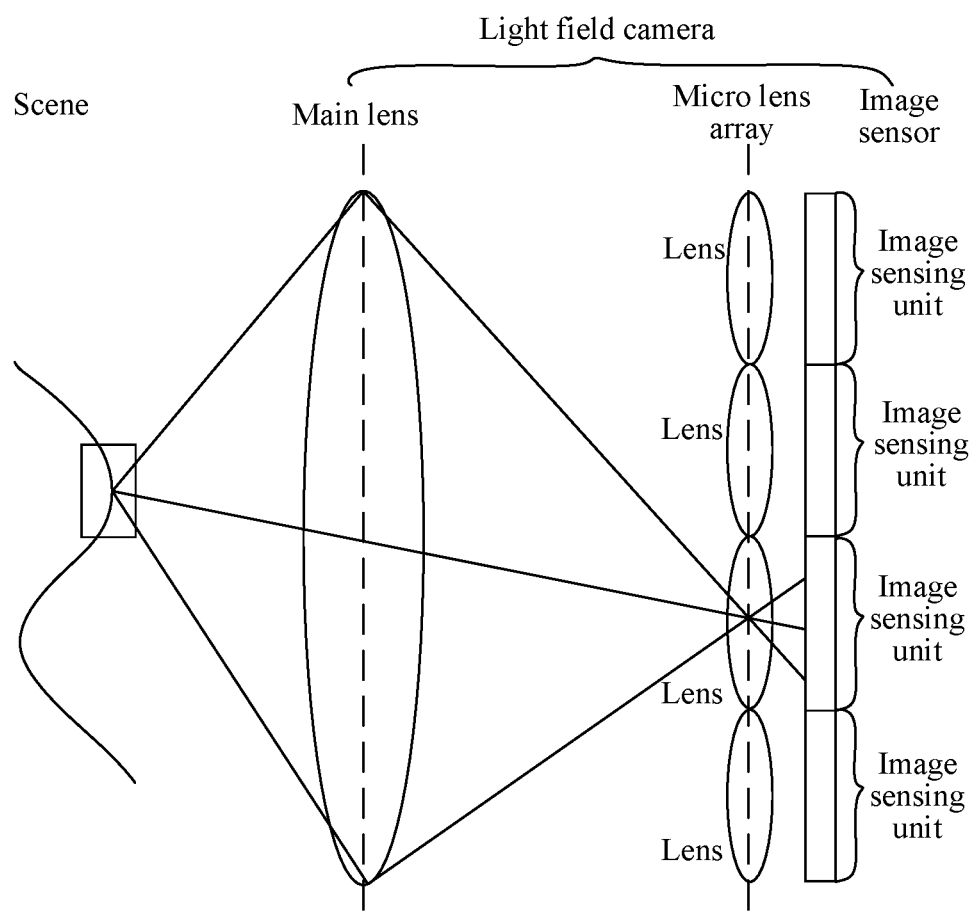
FIG. 7 is a schematic structural diagram of a light field camera according to an example embodiment of the present application.

Optionally, the imaging system may comprise a light field camera, as shown in FIG. 7, the light field camera comprises a main lens, a micro lens array and an image sensor disposed in sequence, the micro lens array comprises a plurality of lenses distributed in array, and the image sensor comprises a plurality of image sensing units distributed in array. The lenses in the micro lens array are disposed corresponding to the image sensing units in the image sensor, and each image sensing unit comprises a plurality of pixels distributed in array, used for recording view information of a same object in different directions in the scene. Objects in the scene and corresponding to different image sensing units may be different. In the light field camera, one or more lenses in the micro lens array may be inclined to implement differential capture of view information of objects in different directions by the image sensing units corresponding to the lenses of the one or more cameras, and thereby a practical application requirement on diversity is met.

In a situation in which a plurality of lenses is inclined, inclining directions and/or inclining angles of at least two lenses in the imaging system relative to the second direction are the same or different. Specifically, in terms of inclining direction, inclining directions of at least two lenses in the imaging system relative to the second direction are the same, or inclining directions of at least two lenses in the imaging system relative to the second direction are different; in terms of inclining angle, inclining angles of at least two lenses in the imaging system relative to the second direction are the same, or inclining angles of at least two lenses in the imaging system relative to the second direction are different; the inclining direction and inclining angle may also be comprehensively considered, to implement flexible control over an optical system and better meet the practical application requirement on diversity.

Figure 8A:
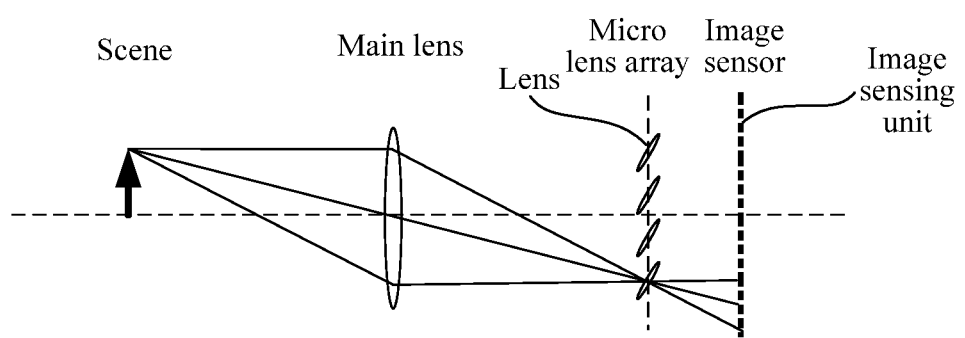
FIG. 8a is an example in which a plurality of image sensing units is inclined according to an embodiment of the present application.

Optionally, both inclining directions and inclining angles of at least two lenses in the imaging system relative to the second direction are the same. For example, as shown in FIG. 8a, in the light field camera, at least two lenses of the micro lens array may be inclined by a same angle and a same inclining direction relative to the second direction. The solution helps in unified control over the differential capture of view information in different directions of the image sensing units corresponding to the at least two lenses.

Figure 8B:
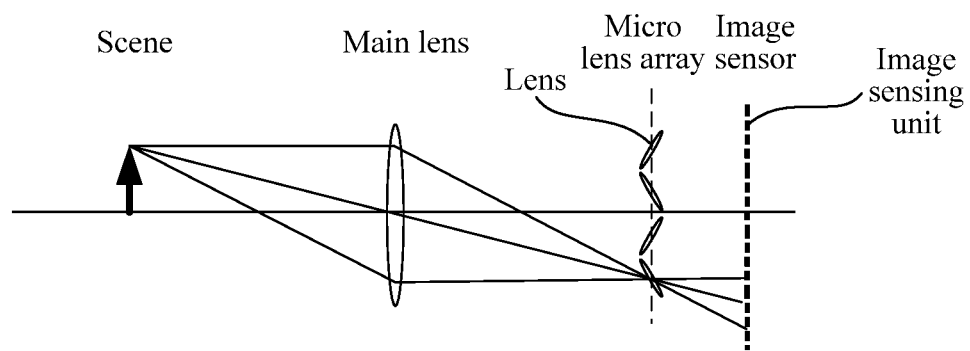
FIG. 8b is another example in which a plurality of image sensing units is inclined according to an embodiment of the present application.

Optionally, at least two adjacent lenses in the imaging system relative to the second direction are reverse in inclining direction and the same in inclining angle. For example, as shown in FIG. 8b, in the light field camera, two adjacent lenses in the micro lens array may be set as a group, the two adjacent lenses in the group are inclined by a same angle relative to a reverse direction of the second direction, for example, in two adjacent lenses A and B, one lens A is clockwise inclined by an angle relative to the second direction by using its optical center as a fulcrum, and the other lens B is counterclockwise inclined by a same angle relative to the second direction by using its optical center as a fulcrum, the shapes of the effective regions of image sensing units corresponding to the inclined two lenses become oval from round, without considering factors such as the translation of the whole effective regions along the second direction, the centers of the ovals and imaging points of the light through the lenses are not coincided and are offset by a degree, and the ovals relative to the imaging points of the light through the optical centers of the lenses are in eccentric distribution; therefore, as viewed from a single image sensing unit, a quantity of pixels on one side of the imaging points of the light through the optical centers of the lenses and a quantity of pixels on the other side of the imaging points of the light through the optical centers of the lenses in the oval effective region are unequal, which causes a difference in resolutions of captured different image information of different views in the first direction. Objects in the scene and corresponding to two adjacent image sensing units are small in difference. In the solution, at least two adjacent lenses are symmetrically inclined to cause oval effective regions after the image sensing units corresponding to the two adjacent lenses are changed to be in symmetric eccentric distribution, and thereby, as viewed from the whole of the two adjacent image sensing units, pixels distributed along the first direction in the two effective regions are uniform as far as possible, thereby mutually complementing resolutions of different view information in the first direction, and helping to acquire a more balanced resolution of different view information in the first direction.

Figure 8C:
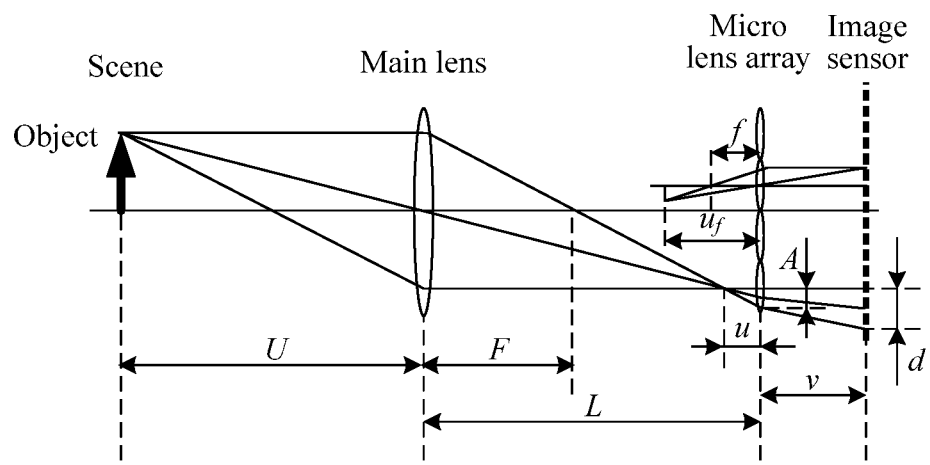
FIG. 8c is an example of a light path of a light field camera according to an embodiment of the present application.

In a situation in which the at least one lens is inclined, a lens is taken as a granularity to incline each lens relative to a respective initial optical axis rather than that an micro lens array is taken as a granularity to incline the whole micro lens array. The benefits of such processing lie in that the control flexibility is improved, and when the scene with a depth is subject to image capture, each lens is inclined relative to a respective initial optical axis, which helps to cause a depth of field range of light field information captured by different image sensing units corresponding to different lenses to overlap to some extent. A possible structure of the light field camera is taken as an example for description. As shown in FIG. 8c, a light path graph of the light field camera may be equivalent to that each micro lens images a real image or virtual image formed by the main lens on an image sensing unit corresponding to the lens in the micro lens array, and therefore light field information of objects of different depths in the scene can be stored by pixel points at different positions on the image sensing unit. It is assumed that a distance from the pixel point in the imaging region to the optical axis of the lens is d, then an imaging radius of a circle of confusion corresponding to objects of different depths in the scene on the image sensor is:

$$d = \frac{Afu_f}{u_f - f}\left(\frac{1}{u_f} - \frac{1}{u}\right) \quad (11)$$

In the formula, A is a radius of the lens, f is a focus length of the lens, $u_f$ is a distance from a focusing plane to the center of the lens, and u is a distance from a real image or virtual image to the center of the lens (the real image is a positive value and the virtual image is a negative value).

An imaging formula of the main lens is:

$$\frac{1}{F} = \frac{1}{U} + \frac{1}{V} = \frac{1}{U} + \frac{l}{L-u} \quad (12)$$

In the formula, U is an object distance from a real object of the scene to the main lens, that is, a distance from a plane (a refocusing plane) of a refocusing point of a refocusing image that can be acquired based on a light field image to the main lens; F is a focus length of the main lens, and L is a distance from an optical center of the main lens to an optical center of the lens.

An imaging formula of a single lens is:

$$\frac{1}{f} = \frac{1}{u_f} + \frac{1}{v} \quad (13)$$

In the formula, V is a distance from a pixel point in an effective region in an image sensing unit corresponding to the lens to the lens.

According to the formulas (11), (12) and (13), it can be acquired that:

$$\frac{1}{U} = \frac{1}{F} + \frac{1}{\frac{1}{f} - \frac{1}{v}\left(1 + \frac{d}{A}\right)} - L \quad (14)$$

It can be seen that after optical parameters of the light field camera are determined, a correspondence exists between U and d, the light field information of object points of different object distances (that is, different depths) may be recorded by pixels in a sub-imaging region with the radius of confusion of circle being d in the effective region corresponding to one lens. If the whole micro lens array is inclined relative to its optical axis around the center, the difference of the distances V between different pixels and the corresponding lenses is larger, resulting in that an overlapping range of depth of field ranges of light field information captured by different image sensing units is excessively small or not overlapped, and thereby, generation of a refocusing image for the captured light field information in the later period and other application may be affected. According to the technical solution provided in this embodiment of the present application, each lens in the at least one lens is inclined relative to a respective initial optical axis, being flexible in control, helping to avoid the excessively large difference of distances between different pixels on the image sensor and the plane of the micro lens array, and to cause the overlapping range of the depth of field range of the light field information captured by different image sensing units to overlap to some extent, and further helping in generation of the refocusing image for the captured light field information in the later period and other application.

Further, with reference to any image capture control method provided in the embodiments of the present application, optionally, before the capturing an image of the scene by using the imaging system, the method further comprises: determining the second direction. After the second direction is determined, according to a relationship between the first direction and the second direction, the first direction is determined, and differential capture of view information in the first direction and the second direction is implemented. In the solution, directions of differential capture of view information may be determined according to actual needs, the implementation manner is flexible and the practical application requirement on diversity is met.

Figure 9A:
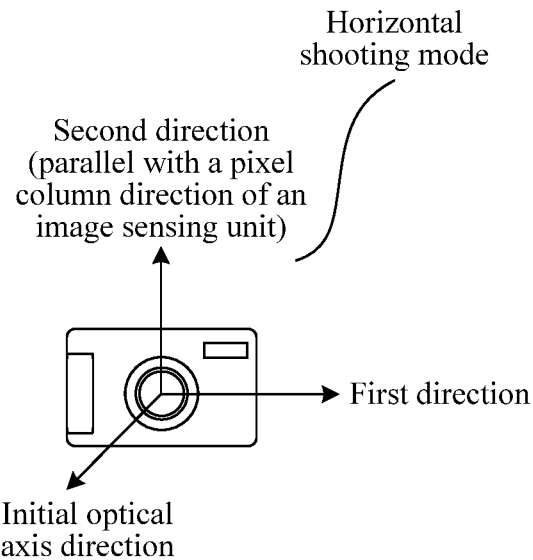
FIG. 9a is an example of a horizontal shooting mode according to an embodiment of the present application.
Figure 9B:
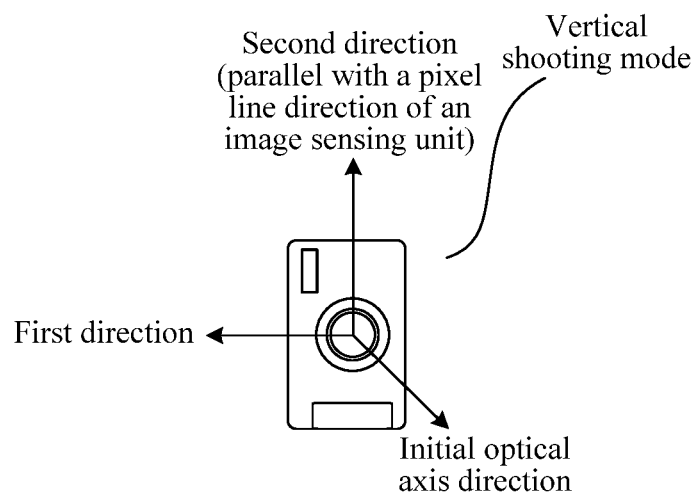
FIG. 9b is an example of a vertical shooting mode according to an embodiment of the present application.

Optionally, the determining the second direction comprises: determining the second direction according to an image capture mode of the imaging system. Scanning output manners of the image capture information corresponding to different image capture modes may vary, in order to facilitate the scanning output of the differential view information capture, the second direction may be determined at least according to the image capture mode of the imaging system. For example, the image capture modes may comprise but are not limited to a horizontal shooting mode and a vertical shooting mode, for example, the reverse direction of the image sensing unit corresponding to the perpendicular direction relatively insensitive to human eyes (or the horizontal direction relatively sensitive to the human eyes) when an image capture apparatus such as a camera is in the horizontal shooting mode is different from the reverse direction of the image sensing unit corresponding to the perpendicular direction relatively insensitive to human eyes (or the horizontal direction relatively sensitive to the human eyes) when the camera is in the vertical shooting mode, and a reference direction corresponding to the image capture mode of the imaging system may be determined as the second direction according to a mapping relationship between the image capture mode and the reference direction. The solution causes the determination of the second direction to be adaptive to the image capture mode. As shown in FIG. 9a and FIG. 9b, it can be determined in advance that the reference direction corresponding to the horizontal shooting mode is parallel with the pixel column direction of the image sensing unit, and that the reference direction corresponding to the vertical shooting mode is parallel with the pixel line direction of the image sensing unit, the pixel line direction and the pixel column direction of the image sensing unit are perpendicular to each other and perpendicular to the normal line thereof, and the normal line of the image sensing unit is parallel with the initial optical axis of the lens, therefore, the pixel line direction and the pixel column direction of the image sensing unit are perpendicular to the initial optical axis of the lens. Next, according to the image capture control method, before the image sensing unit is inclined, according to the current image capture mode of the camera, the reference direction corresponding to the image capture mode may be determined as the second direction. In the solution, the second direction is determined in combination with the position change of the image sensing unit in different image capture modes, to cause the determination of the second direction to have more pertinence, and differential capture of view information in two different directions such as the horizontal direction and vertical direction can be acquired.

Optionally, the determining the second direction comprises: determining the second direction according to an image analysis result of the scene. In natural world, object distribution of the scene presents a rule, for example, under the action of gravity, the scene (for example, a "mountain") may represent a distribution rule such as a large bottom and a small top, and the distribution rule helps to determine the horizontal direction and the vertical direction, and is used as the basis for determining the second direction, to implement differential capture of view information in two directions such as the horizontal direction and the vertical direction.

A person of ordinary skill in the art should understand that in any method of the embodiments of the present application, numbers of steps do not mean the execution sequence, the execution sequence of steps should be determined according to functions and internal logic without causing any limitation to the execution process of the embodiments of the present application in any form.

Figure 10:
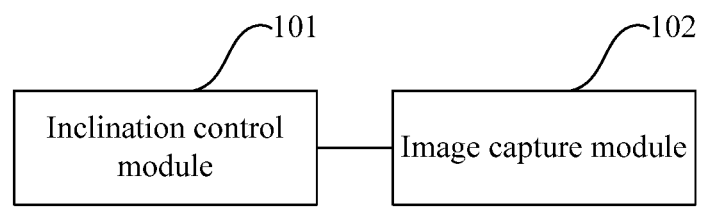
FIG. 10 is a logical block diagram of a first image capture control apparatus according to an example embodiment of the present application.

FIG. 10 is a logical block diagram of a first image capture control apparatus according to an embodiment of the present application. As shown in FIG. 10, the first image capture control apparatus provided in this embodiment of the present application comprises: an inclination control module 101 and an image capture module 102.

The inclination control module 101 is configured to incline at least one lens relative to a respective initial optical axis, to change a ratio of pixels distributed along two directions in an effective region of at least one image sensing unit that is in an imaging system and corresponds to the at least one lens, wherein the effective region is a region in which light through the lens is imaged on the corresponding image sensing unit; the two directions comprise a first direction and a second direction that are perpendicular to the initial optical axis and orthogonal to each other; and the image sensing unit comprises a plurality of pixels distributed in array, and the plurality of pixels is used for recording multidirectional view information of a same object of a scene.

The image capture module 102 is configured to capture an image of the scene by using the imaging system.

According to the technical solution provided in this embodiment of the present application, at least one lens is inclined relative to a respective initial optical axis, to change a ratio of pixels distributed along two directions in an effective region of at least one image sensing unit that is in an imaging system and corresponds to the at least one lens, that is, quantities of the pixels distributed along the two directions in the effective region of the image sensing unit corresponding to the lens after the lens is inclined are different, and the pixel ratio is not equal to 1; in this way, when an imaging system with the inclined lens captures an image of a scene, proportions of parallax information actually recorded by the image sensing unit in a first direction and a second direction can be changed, and differential capture of view information in different directions can be implemented.

There is no limitation to the manners in which the image capture control apparatus is embodied. For example, the image capture control apparatus may be an independent part; or the image capture control apparatus may be a functional module integrated in an imaging device, wherein the imaging device may comprise but is not limited to an electronic device such as a camera, a video camera, a mobile phone or a tablet computer having a camera shooting or photographing function, which is not limited in this embodiment of the present application.

The first direction and the second direction are flexibly determined under the premise of being perpendicular to the initial optical axis of the lens and orthogonal to each other, which is not limited in the present application. Optionally, the first direction is a horizontal direction perpendicular to the initial optical axis. In the solution, differential capture of view information in different directions by the image sensing unit can be implemented, a proportion of view information in the first direction (horizontal direction) is increased in image information captured by the image sensing unit, and/or a proportion of view information in the second direction (vertical direction) is reduced in the image information captured by the image sensing unit, the shape-changed effective region is of an oval with the long axis parallel with the first direction, and thereby, an actual use rate of a resource is improved, and a practical application requirement on diversity is met.

Figure 11:
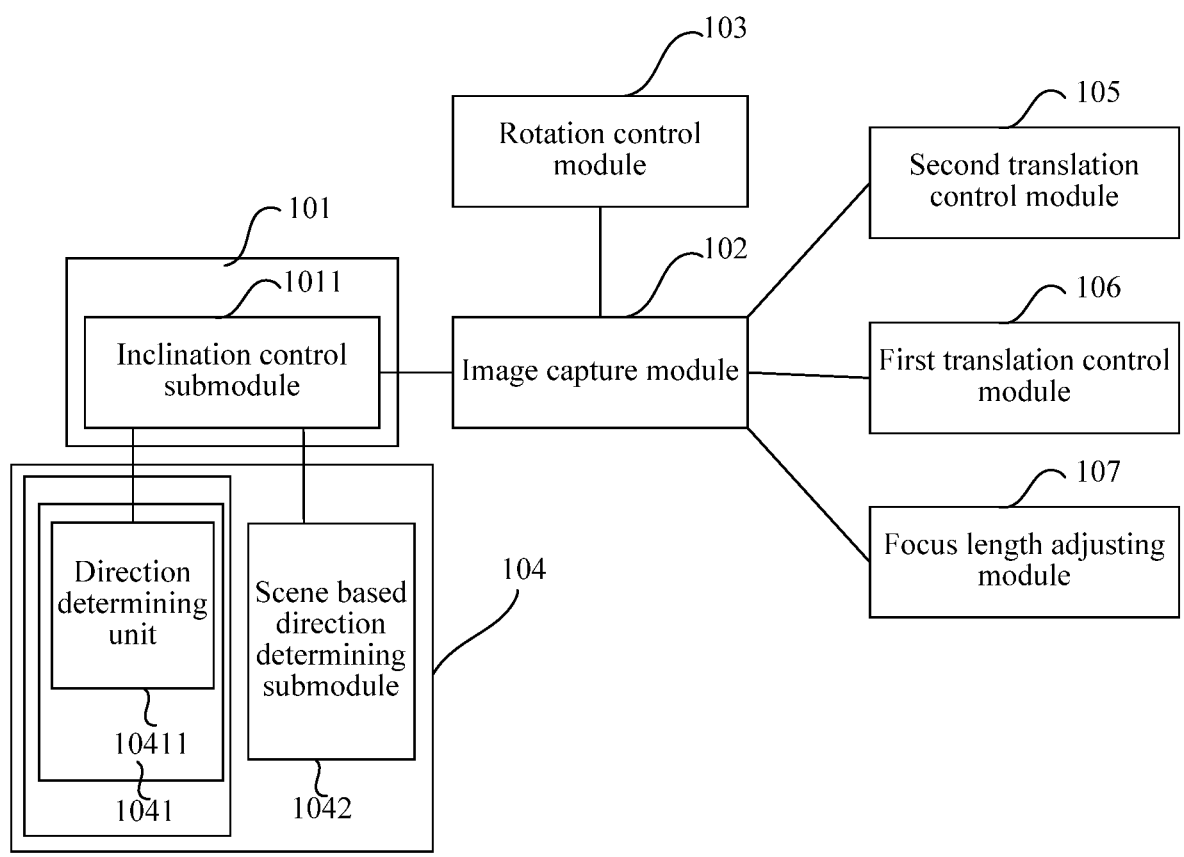
FIG. 11 is a logical block diagram of a second image capture control apparatus according to an example embodiment of the present application.

Optionally, as shown in FIG. 11, the image capture control apparatus further comprises: a first translation control module 106. The first translation control module 106 is configured to translate the lens along the initial optical axis, to enlarge the effective region in which the light through the lens is imaged on the corresponding image sensing unit. In the solution, a maximal variable range of the ratio of the pixels distributed along the first direction and the second direction in the effective region is accordingly increased, and thereby the adjustment flexibility of the ratio of the pixels distributed in the two directions is increased, the universality of the solution is increased, and the practical application requirement on diversity is met.

Optionally, the image capture control apparatus further comprises: a focus length adjusting module 107. The focus length adjusting module 107 is configured to adjust a focus length of the lens, to increase the effective region in which the light through the lens is imaged on the corresponding image sensing unit. In the solution, a maximal variable range of the ratio of the pixels distributed along the first direction and the second direction in the effective region is accordingly increased, and thereby the adjustment flexibility of the ratio of the pixels distributed in the two directions is increased, the universality of the solution is increased, and the practical application requirement on diversity is met.

Optionally, the image capture control apparatus further comprises: a rotation control module 103. The rotation control module 103 is configured to rotate the at least one image sensing unit around a respective normal line, to increase a maximal value of a pixel quantity allowed to be changed along the first direction in the effective region. By using the solution, differential capture of view information in different directions can be implemented, and the actual use rate of the resource is improved as far as possible.

Optionally, the inclination control module 101 comprises: an inclination control submodule 1011. The inclination control submodule is configured to incline the at least one lens by an angle relative to the second direction, to change the shape of the corresponding effective region, thereby reducing a quantity of pixels distributed along the second direction in the corresponding effective region, changing the ratio of the pixels distributed along the first direction and the second direction in the effective region, and improving the capture proportion of the view information in the first direction. Optionally, the shape-changed effective region is of an oval with the short axis parallel with the view information in the second direction, the solution can improve the capture proportion of the view information in the first direction as much as possible, and reduces the capture, output and/or processing quantity of the view information in the second direction, and the actual use rate of the resource is improved.

Optionally, as shown in FIG. 6, the imaging system comprises a camera array, the camera array comprises a plurality of cameras distributed in array, and the cameras comprise lenses and image sensing units disposed in sequence. In the camera array, one or more image sensing units of the cameras may be inclined, to implement differential capture of view information of objects in different directions by the image sensing units corresponding to the lenses of the one or more cameras, and thereby a practical application requirement on diversity is met.

Optionally, as shown in FIG. 7, the imaging system comprises a light field camera, the light field camera comprises a main lens, a micro lens array and an image sensor disposed in sequence, the micro lens arrays comprises a plurality of lenses distributed in array, and the image sensor comprises a plurality of image sensing units distributed in array. In the light field camera, one or more lenses in the micro lens array may be inclined to implement differential capture of view information of objects in different directions by the image sensing units corresponding to the lenses of the one or more cameras, and thereby the practical application requirement on diversity is met.

Optionally, inclining directions and/or inclining angles of at least two lenses in the imaging system relative to the second direction are the same or different. In the solution, the inclining direction and inclining angle can be considered in a separated or combined manner, to implement the flexible control over an optical system and better meet the practical application requirement on diversity.

Optionally, both inclining directions and inclining angles of at least two lenses in the imaging system relative to the second direction are the same. The solution helps in unified control over differential capture of view information in different directions of the at least two image sensing units.

Optionally, at least two lenses in the imaging system relative to the second direction are reverse in inclining direction and the same in inclining angle. In the solution, the at least two adjacent lenses are inclined in a symmetric manner, to cause imaging positions, relative to the optical centers of the lenses, of the oval effective regions of the two adjacent changed image sensing units corresponding to the two inclined adjacent lenses to be in symmetric eccentric distribution, and thereby, as viewed from the whole of the two adjacent image sensing units, pixels distributed along the first direction in the two effective regions are as uniform as possible, mutually complementing resolutions of different view information in the first direction, and helping to acquire a more balanced resolution of different view information in the first direction.

Optionally, the image capture control apparatus further comprises: a second translation control module 105. The second translation control module 105 is configured to translate the at least one lens and/or the image sensing unit corresponding to the at least one lens along the second direction. In the solution, at least one of the lens and the image sensing unit is translated along the second direction, to cause the imaging position of the light through the inclined lens at the plane of the image sensing unit corresponding to the lens to be in the image sensing unit. Further, the movement distance of the lens and/or the image sensing unit along the second direction is controlled, to cause an image of the light through the inclined lens at the plane of the image sensing unit corresponding to the lens to be symmetrically distributed in the image sensing unit, so as to better capture the view information of the light in different directions.

Optionally, the image capture control apparatus further comprises: a direction determining module 104. The direction determining module is configured to determine the second direction, and enable the inclination control module 101 according to a determining result. In the solution, directions of differential capture of view information are determined according to actual needs, the implementation manner is flexible and the practical application requirement on diversity is met.

Optionally, the direction determining module 104 comprises: a mode based direction determining submodule 1041. The mode based direction determining submodule 1041 is configured to determine the second direction according to an image capture mode of the imaging system. In the solution, the second direction is determined in combination with the position change of the image sensing unit in different image capture modes, to cause the determination of the second direction to have more pertinence, and differential capture of view information in two different directions such as the horizontal direction and vertical direction can be acquired. Further, optionally, the mode based direction determining submodule 1041 comprises: a direction determining unit 10411. The direction determining unit 10411 is configured to determine a reference direction corresponding to the image capture mode of the imaging system as the second direction according to a mapping relationship between the image capture mode and the reference direction. The solution is simple and easy to implement.

Optionally, the direction determining module 104 comprises: a scene based direction determining submodule 1042. The scene based direction determining submodule 1042 is configured to determine the second direction according to an image analysis result of the scene. In the solution, an object distribution rule of the scene may be determined by an image analysis means, and is used as the basis for determining the first direction, to implement differential capture of view information in two directions such as the horizontal direction and the vertical direction.

Figure 12:
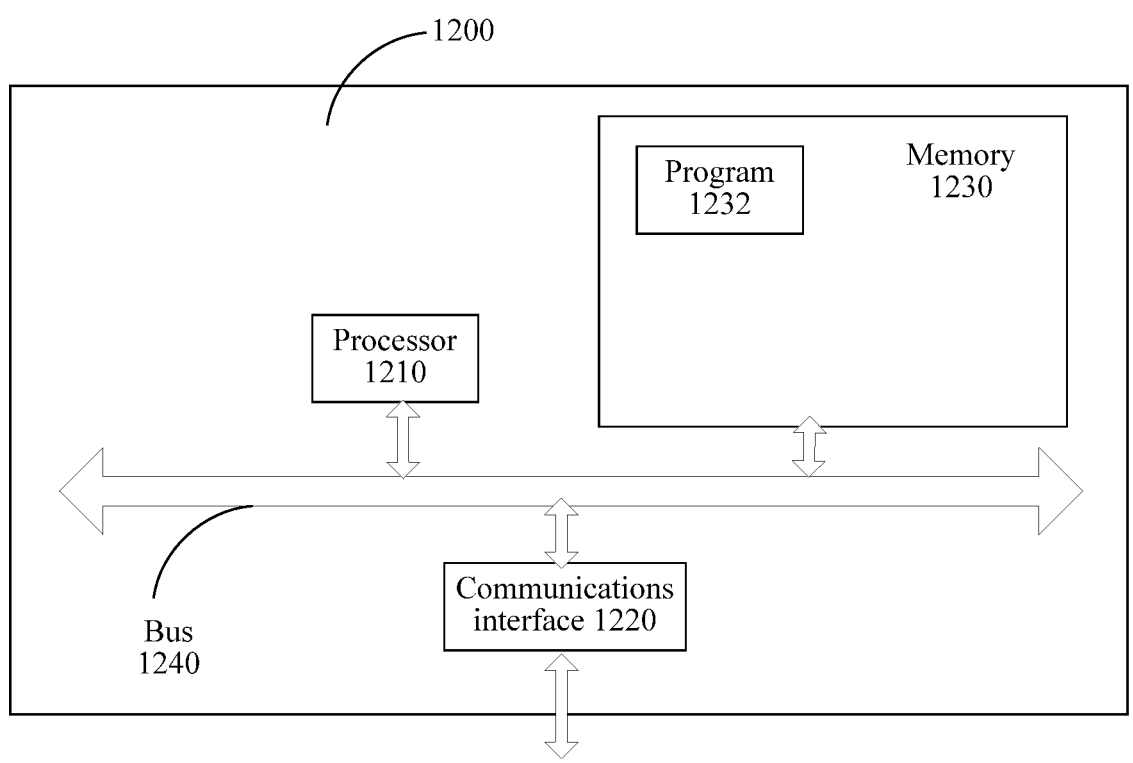
FIG. 12 is a logical block diagram of a third image capture control apparatus according to an example embodiment of the present application.

FIG. 12 is a schematic structural diagram of a third image capture control apparatus according to an embodiment of the present application, and the image capture control apparatus 1200 is not limited in this embodiment of the present application. As shown in FIG. 12, the image capture control apparatus 1200 may comprise:

a processor 1210, a communications interface 1220, a memory 1230 and a communications bus 1240.

The processor 1210, the communications interface 1220, and the memory 1230 communicate with one another by using the communications bus 1240.

The communications interface 1220 is configured to communicate with a deformable image sensor and the like.

The processor 1210 is configured to execute a program 1232, and specifically execute related steps in any method embodiment above.

For example, the program 1232 may comprise a program code, and the program code comprises a computer operation instruction.

The processor 1210 may be a central processing unit (CPU), or an application specific integrated circuit (ASIC) or configured to be one or more integrated circuits implementing the embodiments of the present application.

The memory 1230 is configured to store the program 1232. The memory 1230 may comprise a random access memory (RAM), and may further comprise a non-volatile memory, such as at least one magnetic disk storage.

For example, in one example embodiment, the processor 1210 can execute the following steps by executing the program 1232: inclining at least one lens relative to a respective initial optical axis, to change a ratio of pixels distributed along two directions in an effective region of at least one image sensing unit that is in an imaging system and corresponds to the at least one lens, wherein the effective region is a region in which light through the lens is imaged on the corresponding image sensing unit; the two directions comprise a first direction and a second direction that are perpendicular to the initial optical axis and orthogonal to each other; and the image sensing unit comprises a plurality of pixels distributed in array, and the plurality of pixels is used for recording multidirectional view information of a same object of a scene; and capturing an image of the scene by using the imaging system. In other example embodiments, the processor 1210 can execute the steps mentioned in any other embodiment by executing the program 1232, and details are not repeated herein.

For each step in the program 1232, reference may be made to the corresponding description of corresponding steps, modules, submodules and units in foregoing embodiments, and details are not repeated herein. A person of ordinary skill in the art can clearly understand that for convenient and brief description, for a specific work process of the foregoing devices and modules, reference may be made to the corresponding process description in the embodiments of the methods, and details are not repeated herein.

In the foregoing embodiments of the present application, the serial number and/or sequence of the embodiments are only intended for the convenience of description, and do not represent inferiority or superiority of the embodiments. The description of each embodiment has a different focus. For any part of an embodiment not described in details, refer to relevant description of another embodiment. For relevant description of the implementation principle or process of apparatus, device or system embodiments, refer to records of relevant method embodiments. Details are not described herein again.

A person of ordinary skill in the art may recognize that, the units, methods and procedures of each example described with reference to the embodiments disclosed herein can be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present application.

When the functions are implemented in a form of a software functional unit and sold or used as an independent product, the functions may be stored in a computer-readable storage medium. Based on such an understanding, the technical solutions of the present application essentially, or a part thereof contributing to the existing art, or a part of the technical solutions may be implemented in the form of a software product. The computer software product is stored in a storage medium and comprises several instructions for instructing a computer device (which may be a personal computer, a server, a network device, or the like) to perform all or some of the steps of the image capture control methods in the embodiments of the present application. The foregoing storage medium comprises: any medium that can store program code, such as a USB flash drive, a removable hard disk, a read-only memory (ROM), a random access memory (RAM), a magnetic disk, or an optical disc.

In the apparatus, method and system embodiments of the present application, apparently, each component (such as a system, a sub-system, a module, a sub-module, a unit, and a sub-unit) or each step may be decomposed, combined and/or recombined after decomposition. Such decomposition and/or recombination shall be considered as an equivalent solution of the present application. In addition, in the above description of specific embodiments of the present application, a feature described and/or shown in one embodiment may be used in one or more other embodiments by using a same or similar manner, combined with a feature of another embodiment, or replace a feature of another embodiment.

It should be emphasized that, the term "comprise" used herein refers to existence of a feature, an element, a step or a component, but does not exclude existence or addition of one or more other features, elements, steps or components.

Finally, it should be noted that, the above example embodiments are only used to describe the present application, rather than limit the present application. Various alterations and variants may also be made by a person of ordinary skill in the art without departing from the spirit and scope of the present application. Therefore, all equivalent technical solutions also belong to the scope of the present application, and the patent protection scope of the present application should be subject to the claims.

What is claimed is:

1. A method, comprising:
   inclining, by a system comprising a processor, at least one lens relative to at least one respective initial optical axis, to change a ratio of pixels distributed along two directions in an effective region of at least one image sensing unit that is in an imaging system and corresponds to the at least one lens, wherein the effective region is a region in which light through a lens of the at least one lens is imaged on a corresponding image sensing unit of the at least one image sensing unit, wherein the two directions comprise a first direction and a second direction that are perpendicular to the initial optical axis and orthogonal to each other, wherein the image sensing unit comprises a plurality of pixels distributed in array, and wherein the plurality of pixels is used for recording multidirectional view information of a same object of a scene;
   rotating, by the system, the at least one image sensing unit around a respective initial direction, to increase a maximal value of a pixel quantity allowed to be changed along the first direction in the effective region; and
   capturing, by the system, an image of the scene by using the imaging system.

2. The method of claim 1, wherein the imaging system comprises a light field camera, wherein the light field camera comprises a main lens, a micro lens array and an image sensor disposed in sequence, wherein the micro lens array comprises a plurality of lenses distributed in array, and wherein the image sensor comprises a plurality of image sensing units distributed in array.

3. The method of claim 1, wherein the imaging system comprises a camera array, wherein the camera array comprises a plurality of cameras distributed in array, and wherein the plurality of cameras comprises lenses and image sensing units disposed in sequence.

4. The method of claim 1, wherein the second direction is a perpendicular direction perpendicular to an initial optical axis of the at least one respective initial optical axis.

5. The method of claim 1, further comprising:
   before the capturing the image of the scene by using the imaging system, translating, by the system, the lens along the initial optical axis, to enlarge the effective region in which the light through the lens is imaged on the corresponding image sensing unit.

6. The method of claim 1, further comprising:
   before the capturing the image of the scene by using the imaging system, adjusting, by the system, a focus length of the lens, to enlarge the effective region in which the light through the lens is imaged on the corresponding image sensing unit.

7. The method of claim 1, wherein the inclining at least one lens relative to the at least one respective initial optical axis, to change the ratio of pixels distributed along the two directions in the effective region of the at least one image sensing unit that is in the imaging system and corresponds to the at least one lens comprises:
   inclining the at least one leans by an angle relative to the second direction, to change a shape of the effective region resulting in a shape-changed effective region, thereby reducing a quantity of pixels distributed along the second direction in the effective region.

8. The method of claim 7, wherein the shape-changed effective region is of an oval with a short axis of the shape-changed effective region parallel with the second direction.

9. The method of claim 7, wherein inclinations of directions or angles of at least two lenses in the imaging system relative to the second direction are same or different.

10. The method of claim 9, wherein the inclinations of the directions and the angles of the at least two lenses in the imaging system relative to the second direction are the same.

11. The method of claim 9, wherein at least two lenses in the imaging system relative to the second direction are reverse in inclining direction and have a same inclining angle.

12. The method of claim 1, further comprising:
before the capturing of the image of the scene by using the imaging system, translating, by the system, the at least one lens or the image sensing unit corresponding to the at least one lens along second direction.

13. The method of claim 1, further comprising:
before the inclining at least one lens relative to a respective initial optical axis, determining, by the system, the second direction.

14. The method of claim 13, wherein the determining the second direction comprises:
determining the second direction according to an image capture mode of the imaging system.

15. The method of claim 14, wherein the determining the second direction according to the image capture mode of the imaging system comprises:
determining a reference direction corresponding to the image capture mode of the imaging system as the second direction according to a mapping relationship between the image capture mode and the reference direction.

16. The method of claim 15, wherein the determining the second direction comprises:
determining the second direction according to an image analysis result of the scene.

17. An apparatus, comprising:
a memory that stores executable modules; and
a processor, coupled to the memory, that executes or facilitates execution of the executable modules, the executable modules comprising:
an inclination control module configured to incline a lens relative to an initial optical axis, to change a ratio of pixels distributed along two directions in an effective region of an image sensing unit that is in an imaging system and corresponds to the lens, wherein the effective region is a region in which light through the lens is imaged on the image sensing unit, the two directions comprise a first direction and a second direction that are perpendicular to the initial optical axis and orthogonal to each other, the image sensing unit comprises a first array of pixels, and the first array of pixels is used for recording multidirectional view information of a same object of a scene;
a rotation control module configured to rotate the image sensing unit around a respective normal line, to increase a maximal value of a pixel quantity allowed to be changed along the first direction in the effective region; and
an image capture module configured to capture an image of the scene by using the imaging system.

18. The apparatus of claim 17, wherein the imaging system comprises a light field camera, the light field camera comprises a main lens, a micro lens array and an image sensor disposed in sequence, the micro lens array comprises a second array of lenses, and the image sensor comprises a third array of image sensing units.

19. The apparatus of claim 17, wherein the imaging system comprises a camera array, the camera array comprises a second array of cameras, and the cameras comprise lenses and image sensing units disposed in sequence.

20. The apparatus of claim 17, wherein the second direction is a perpendicular direction perpendicular to the initial optical axis.

21. The apparatus of claim 17, wherein the executable modules further comprise:
a first translation control module configured to translate the lens along the initial optical axis, to enlarge the effective region in which the light through the lens is imaged on the image sensing unit.

22. The apparatus of claim 17, wherein the executable modules further comprise:
a focus length adjusting module configured to adjust a focus length of the lens, to increase the effective region in which the light through the lens is imaged on the image sensing unit.

23. The apparatus of claim 17, wherein the inclination control module comprises:
an inclination control submodule configured to incline the lens by an angle relative to the second direction, to change a shape of the effective region resulting in a shape-changed effective region, thereby reducing a quantity of pixels distributed along the second direction in the effective region.

24. The apparatus of claim 23, wherein the shape-changed effective region is of an oval with a short axis parallel with the second direction.

25. The apparatus of claim 23, wherein directions or angles of incline of at least two lenses in the imaging system relative to the second direction are same or different.

26. The apparatus of claim 25, wherein the directions or angles of incline of at least two lenses in the imaging system relative to the second direction are same directions or angles.

27. The apparatus of claim 25, wherein at least two lenses in the imaging system relative to the second direction are reverse in inclining direction and same in inclining angle.

28. The apparatus of claim 17, wherein the executable modules further comprise:
a second translation control module configured to translate the lens or the image sensing unit corresponding to the lens along the second direction.

29. The apparatus of claim 17, wherein the executable modules further comprise:
a direction determining module configured to determine the second direction and enable the inclination control module according to a determining result of the direction determining module.

30. The apparatus of claim 29, wherein the direction determining module comprises:
a mode based direction determining submodule configured to determine the second direction according to an image capture mode of the imaging system.

31. The apparatus of claim 30, wherein the mode based direction determining submodule comprises:
a direction determining unit configured to determine a reference direction corresponding to the image capture mode of the imaging system as the second direction according to a mapping relationship between the image capture mode and the reference direction.

32. The apparatus of claim 29, wherein the direction determining module comprises:
- a scene based direction determining submodule configured to determine the second direction according to an image analysis result of the scene.

33. A computer readable storage apparatus, comprising at least one executable instruction, which, in response to execution, causes an image capture control method, comprising:
- inclining respective lenses relative to respective initial optical axes, to change a ratio of pixels distributed along respective two directions in effective regions of image sensing units that are in an imaging system and correspond to the at least one lens, wherein the effective regions are regions in which light through a lens of the respective lens is imaged on a corresponding image sensing unit of the image sensing units, the respective two directions comprise a respective first direction and a respective second direction that are perpendicular to a respective initial optical axis of the respective initial optical axes and orthogonal to each other; and the image sensing unit comprises an array of pixels, and the array of pixels is used for recording multidirectional view information of a same object of a scene;
- rotating the image sensing units around a respective initial direction, to increase a maximal value of a pixel quantity allowed to be changed along the first direction in the effective region; and
- capturing an image of the scene by using the imaging system.

34. An apparatus, characterized by comprising a processor and a memory, the memory storing executable instructions, the processor being connected to the memory through a communication bus, and when the apparatus for controlling task migration operates, the processor executing the executable instructions stored in the memory, so that the apparatus executes operations, comprising:
- inclining at least one lens relative to a respective initial optical axis, to change a ratio of pixels distributed along two directions in an effective region of at least one image sensing unit that is in an imaging system and corresponds to the at least one lens, wherein the effective region is a region in which light through a lens of the at least one lens is imaged on a corresponding image sensing unit, the two directions comprise a first direction and a second direction that are perpendicular to the respective initial optical axis and orthogonal to each other; and the image sensing unit comprises a plurality of pixels distributed in array, and the plurality of pixels is used for recording multidirectional view information of a same object of a scene;
- rotating the at least one image sensing unit around a respective initial direction, to increase a maximal value of a pixel quantity allowed to be changed along the first direction in the effective region; and
- capturing an image of the scene by using the imaging system.

35. The apparatus of claim 34, wherein the imaging system comprises a light field camera, wherein the light field camera comprises a main lens, a micro lens array and an image sensor disposed in sequence, wherein the micro lens array comprises a plurality of lenses distributed in array, and wherein the image sensor comprises a plurality of image sensing units distributed in array.

36. The apparatus of claim 34, wherein the imaging system comprises a camera array, wherein the camera array comprises a plurality of cameras distributed in array, and wherein the plurality of cameras comprises lenses and image sensing units disposed in sequence.

* * * * *